UNITED STATES PATENT OFFICE.

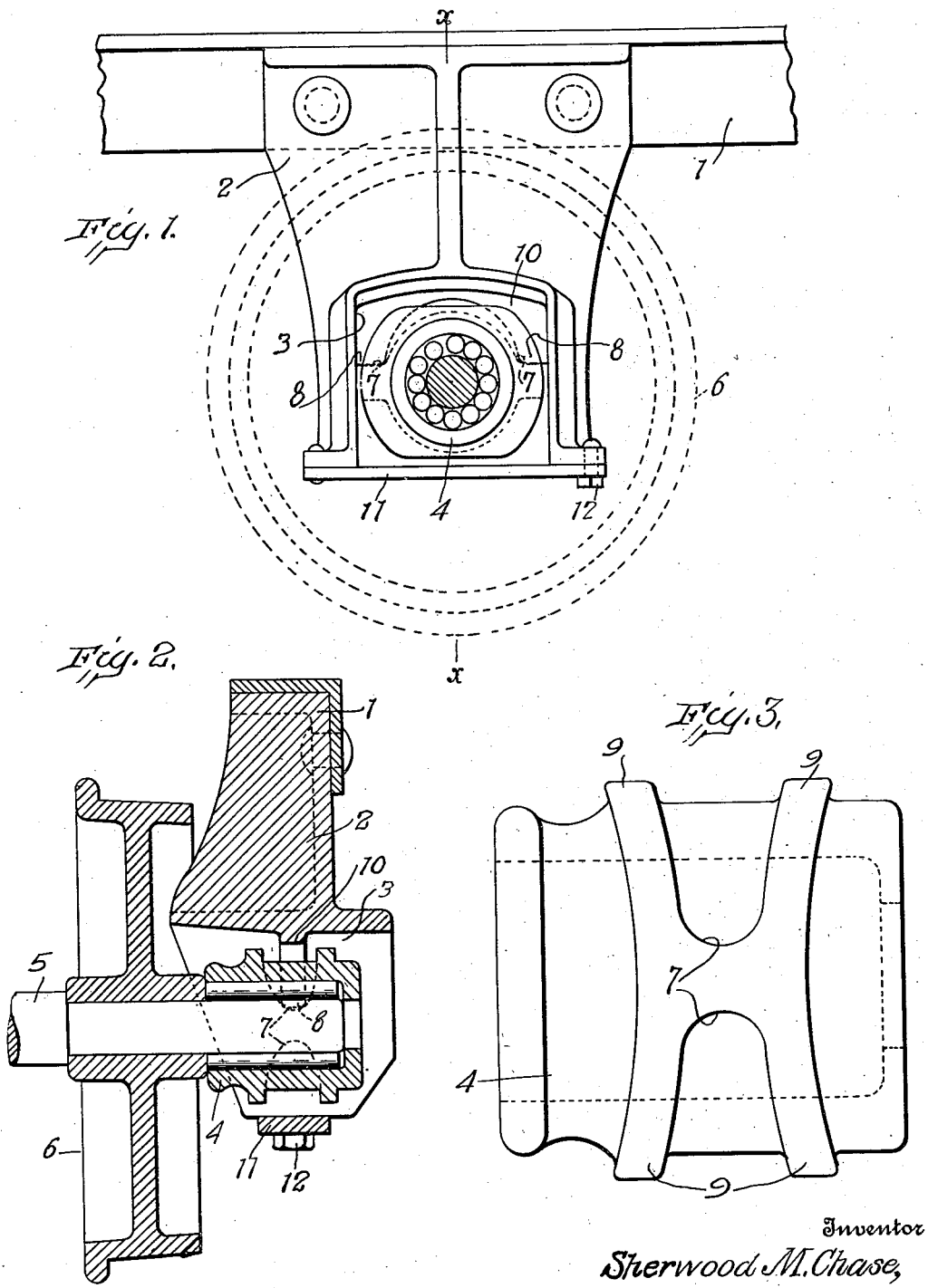

SHERWOOD M. CHASE, OF COLUMBUS, OHIO, ASSIGNOR TO THE CHASE FOUNDRY AND MANUFACTURING COMPANY, OF COLUMBUS, OHIO, A CORPORATION OF OHIO.

FLEXIBLE BEARING.

1,011,885.      Specification of Letters Patent.      Patented Dec. 12, 1911.

Application filed May 1, 1911. Serial No. 624,402.

*To all whom it may concern:*

Be it known that I, SHERWOOD M. CHASE, a citizen of the United States, residing at Columbus, in the county of Franklin and State of Ohio, have invented certain new and useful Improvements in Flexible Bearings, of which the following is a specification, reference being had therein to the accompanying drawing.

This invention relates to flexible bearings and is designed more particularly for use in connection with cars or trucks such as are employed on industrial railroads, the tracks of which are often very uneven.

The object of the invention is to provide a bearing of this character which will automatically accommodate itself to the irregularities in the tracks without imposing strain upon the truck; which will be of a very simple construction comprising a minimum number of parts; and which will be of a strong, durable character having no parts which may be easily broken or disarranged.

It is also an object of the invention to make the journal box forming a part of the bearing reversible.

In the accompanying drawings, Figure 1 is a side elevation of a portion of a truck embodying my invention; Fig. 2 is a vertical, sectional view, taken on the line *x x* of Fig. 1; and Fig. 3 is a detail view of the journal box.

In these drawings I have illustrated one embodiment of my invention and have shown the same as applied to an industrial car or truck, a portion of the frame of which is indicated by the reference numeral 1. Rigidly secured to and depending from this frame is a bearing bracket 2, the lower end of which is bifurcated to form an opening 3 in which is mounted a journal box 4 adapted to receive the adjacent end of an axle 5 which carries wheels 6. In order that this bearing may readily accommodate itself to the irregularities in the track it is freely movable both in a vertical plane and about a horizontal axis extending transversely to the axle 5. To this end the journal box 4 is provided on the opposite sides of the axle with external bearings 7 adapted to receive and coöperate with trunnions 8 rigidly secured to the bracket 2. The trunnions fit loosely within the bearings and not only permit the journal box to move freely about the axis of the trunnions but also permit the latter to have a vertical movement relatively to the bracket. In the present construction the bearings 7 comprise the ends of transverse grooves formed on the exterior surface of the journal box, preferably by providing the same with transverse ribs 9 which converge from their centers toward the ends and have the ends rounded to form the bearings 7. The trunnions 8 preferably comprise the lower ends of a rib 10 rigidly secured to and preferably formed integral with the bracket 2 and extending transversely with the bracket 5. The lower ends of these ribs are arranged in substantially the same horizontal plane and are rounded to coöperate with the rounded ends of the groove in the journal box. This groove being of greater width at its central or upper portion than at its ends permits the rib 10 to move freely therein and the movement of the journal box about a transverse axis is in nowise interfered with.

It will be noted that I have provided the journal box with grooves both on the upper and lower sides thereof, thus providing the same with two sets of bearings and enabling the journal box to be reversed. The vertical movement of the journal box, relatively to the bracket is limited by a cross bar 11 connecting the lower ends of the bifurcated portion of the bracket 2 and preferably pivotally connected to one of these arms and connected to the other thereof by a removable screw 12, thus enabling the bar to be displaced when it is desired to remove the bearing from the bracket.

It will be observed that the construction of the bearing is a very strong one and that it comprises a minimum number of parts, the flexibility of the bearing being secured, in fact, without the addition of any extra parts, the transverse bearing being formed in the body of the journal box and the trunnions which coöperate with these bearings being preferably formed integral with the bearing bracket 2. This construction not only permits the free movement of the journal box about a transverse axis but also permits the same to move vertically relatively to the bracket, and, in this manner, the bearing will accommodate itself to all irregularities in the track.

While I have herein shown and described one form of my invention I wish it to be understood that this form is chosen for the purpose of illustration only and I do not desire to be limited to the details of construction shown and described, for obvious modifications will occur to a person skilled in the art.

Having thus fully described my invention, what I claim as new and desire to secure by Letters Patent, is:—

1. The combination, with a main frame, an axle, and wheels carried by said axle, of a bracket carried by said main frame and having trunnions arranged in a substantially horizontal plane, and a journal box adapted to receive one end of said axle and having bearings to receive said trunnions.

2. The combination, with a main frame, an axle, and wheels carried by said axle, of a bracket carried by said main frame and having an opening therein, a journal box loosely mounted in said opening and having external bearings, and horizontal trunnions rigidly secured to said bracket and adapted to engage said bearings.

3. The combination, with a bearing bracket having an inwardly extending rib, the ends of which constitute trunnions, of a journal box having recesses formed in the opposite sides thereof to form bearings for said trunnions.

4. The combination, with a bearing bracket having an inwardly extending rib, the ends of which constitute trunnions of a journal box having a transverse groove, the ends of which are arranged on opposite sides of said journal box and constitute bearings for said trunnions, the side walls of said groove diverging from the ends toward the center thereof.

5. The combination, with a bearing bracket having an inwardly extending rib, the ends of which constitute trunnions, of a journal box having a transverse groove in the upper and lower sides thereof, the ends of either of said grooves being adapted to receive said trunnions and form bearings therefor, thereby enabling said journal box to be reversed.

6. The combination, with a bearing bracket having an opening therein and having inwardly extending trunnions rigidly secured thereto, of a journal box loosely mounted in said opening and having recesses formed in the opposite sides thereof and opening upwardly to receive said trunnions and form bearings therefor, thereby enabling said journal box to move about a transverse axis and also to move vertically relatively to said bracket.

In testimony whereof, I affix my signature in presence of two witnesses.

SHERWOOD M. CHASE.

Witnesses:
  HOMER E. FIERRELL,
  F. E. WILLIAMS.